Patented Oct. 29, 1929

1,733,639

UNITED STATES PATENT OFFICE

ROBERT H. VAN SCHAACK, JR., AND ROBERT CALVERT, OF CHICAGO, ILLINOIS, ASSIGNORS TO VAN SCHAACK BROS. CHEMICAL WORKS, INC., A CORPORATION OF ILLINOIS

DERIVATIVE OF ETHYLENE GLYCOL

No Drawing. Application filed May 2, 1927. Serial No. 188,398.

Our invention relates to a new and useful composition of matter comprising a derivative of ethylene gycol with an organic acid, or with two or more organic acids. The object of the invention is to provide a new series of chemical compounds possessing valuable properties which are characteristic of those compounds. Another object is to provide new solvents for nitrocellulose. A further object is to provide pyroxylin lacquers which contain solvents for the pyroxylin which are less volatile than most, if not all, solvents now in use.

This application is a continuation in part of our co-pending application 145,096, filed Oct. 29, 1926.

(1) $C_6H_4.(COOK)_2 + 2ClCH_2.CH_2.OH = C_6H_4.(COOCH_2.CH_2OH)_2 + 2KCl$.

The precipitated potassium chloride is removed by settling or filtration. The excess of ethylene chlorohydrin is removed by distillation. The new compound, beta-hydroxyl-ethyl phthalate, is then purified in any suitable manner, as by dissolving in alcohol, filtering with decolorizing charcoal, and then evaporating the alcohol. Since beta-hydroxy-ethyl phthalate retards the evaporation of the alcohol, we resorted, in one experiment, to the use of high temperature and vacuum to remove the last portion of alcohol. We heated the material in a flask at 40 mm. pressure, in an oil bath at 220° C., for 40 minutes. Or, the beta-hydroxyl-ethyl phthalate may be converted to a derivative formed by esterifying one or both of the remaining hydroxyl groups with acetic of other volatile organic acid. Thus, we may produce the reaction

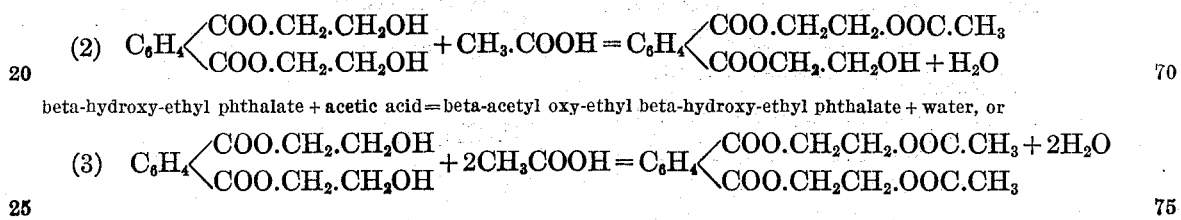

beta-hydroxy-ethyl phthalate + acetic acid = beta-acetyl oxy-ethyl beta-hydroxy-ethyl phthalate + water, or

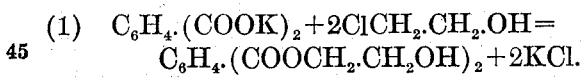

When butyl alcohol became available in quantity, its ester with phthalic anhydride came into wide use as a plasticizer in lacquers. Now that ethylene glycol is being made, in quantity, we have developed a large series of esters derived from the glycol, or from ethylene chlorohydrin, the intermediate compound in the synthesis of glycol.

The chemical relationships of these compounds as well as one method of preparation are illustrated by the following procedure. We may first produce beta-hydroxy ethyl phthalate, as by refluxing an excess (more than two molecular weights) of anhydrous ethylene chlorohydrin with one molecular weight of potassium phthalate. The reaction is the products here being beta-acetyl oxy-ethyl phthalate and water.

In an unsuccessful attempt to distill the product, we heated one preparation in a flask in a partial vacuum, with a slow stream of air being drawn through, in a sand bath at 240° C., for approximately half an hour. The lower the vacuum, the more nearly complete is the removal of volatile materials such as water and uncombined acetic acid or phthalic anhydride.

We may substitute for the acetic acid, other organic acids, such as propionic, or butyric. Also, we may substitute the salts of other acids than phthalic acid in reaction (1) above. Thus we may use, for example, the salt of a fatty, monobasic acid such as stearic $C_{17}H_{35}.COOH$, or a fatty dibasic acid such as oxalic $(COOH)_2$, an aromatic monobasic acid such as benzoic $C_6H_5.COOH$, some other dibasic aromatic acid than phthalic, or a polybasic organic acid. We may use the radicals of different acids on the two sides of the ethylene grouping.

Also, we may vary the method of preparation of the compound. In one preparation, for example, we have esterified ethylene glycol monoacetate with phthalic anhydride in the presence of a trace of sulfuric acid. In another, we have digested 2 molecules of ethylene glycol with one molecule of phthalic anhydride, with the same catalyst as before, and then esterified the product with 2 molecules of acetic acid.

To illustrate our invention more broadly, we list below several types of our new compounds with an example of each.

| No. | Example | Type formula |
|---|---|---|
| A | $C_{17}H_{35}.COO.CH_2.CH_2OH$ — Ethylene glycol monostearate | $R^1.CH_2.CH_2OH$ |
| B | $C_{17}H_{35}.COO.CH_2.CH_2.OOC.CH_3$ — Ethylene monostearate monoacetate | $R^1.CH_2.CH_2.R^2$ |
| C | $(COO)_2(CH_2.CH_2OH)_2$ — Ethylene glycol monooxalate | $R^3.(CH_2.CH_2OH)_2$ |
| D | $(COO)_2(CH_2.CH_2.OOC.CH_3)_2$ — Beta-acetyl oxy-ethyl oxalate | $R^3.(CH_2.CH_2.R^2)_2$ |
| E | $C_6H_5.COO.CH_2.CH_2OH$ — Ethylene glycol monobenzoate | $R^4.CH_2.CH_2OH$ |
| F | $C_6H_5.COO.CH_2.CH_2.OOC.CH_3$ — Ethylene monobenzoate monoacetate | $R^4.CH_2.CH_2.R^2$ |
| G | $C_6H_4\langle{COO.CH_2.CH_2OH \atop COO.CH_2.CH_2OH}$ — Beta-hydroxy-ethyl phthalate | $R^5.(CH_2.CH_2OH)_2$ |
| H | $C_6H_4\langle{COO.CH_2.CH_2.OOC.CH_3 \atop COO.CH_2.CH_2OH}$ — Beta-acetyl oxy-ethyl beta-hydroxy-ethyl phthalate | $R^5\langle{CH_2.CH_2.R^2 \atop CH_2.CH_2OH}$ |
| I | $C_6H_4\langle{COO.CH_2.CH_2.OOC.CH_3 \atop COO.CH_2.CH_2.OOC.CH_3}$ — Beta-acetyl oxy-ethyl phthalate | $R^5.(CH_2.CH_2.R^2)_2$ |

The compounds illustrated in Examples A to I are not appreciably volatile at ordinary temperatures, do not boil below 260° C., at atmospheric pressure, are solvents for pyroxylin (with the exception of the types illustrated by the stearates in Examples A and B), and are best identified by their saponification numbers, analysis for C, H, and O, and qualitative tests for the various groups present.

For convenience, in the claims and elsewhere, we define the names of the new compounds there used to mean the compounds of the formulas given in Examples A to I in association with the several names.

Also, we attach certain meanings to $R^1$ to $R^5$ inclusive, and intend that these symbols, wherever used by us, should have, respectively, the following meaning:

$R^1$ the radical of an aliphatic, monobasic acid containing more than 10 carbon atoms to the molecule.

$R^2$, the radical of an aliphatic monobasic acid having, to the molecule, less than six carbon atoms.

$R^3$, the radical of an aliphatic, dibasic acid.

$R^4$, the radical of an aromatic, monobasic acid.

$R^5$, the radical of an aromatic, dibasic acid.

There is evident a considerable variation in the particular acid or acids that may be used in the compounds of the several types.

It will be clear that the term radical, as used by us, means the group left by removing the hydrogen from the carboxyl group or groups in the formula of an organic acid. For example, $R^1$ may be the radical of stearic, palmitic, oleic, ricinoleic, or other monobasic fatty acid with more than ten carbon atoms to the molecule; $R^2$, the radical of acetic, propionic, butyric, or other monobasic fatty acid that has less than six carbon atoms to the molecule; $R^3$, the radical of such an acid as oxalic, tartaric, or maleic; $R^4$, the radical of benzoic, salicylic, toluic, phenyl acetic, or similar acid; $R^5$, the radical of one of the phthalic acids, such as the ortho-, or other dibasic aromatic acid.

The properties of the beta-acetyl oxy-ethyl phthalate, $C_6H_4\langle{COO.CH_2.CH_2.OOC.CH_3 \atop COO.CH_2.CH_2.OOC.CH_3}$ are such as to adapt it especially to commercial usage. In the liquid state it is viscous and, hence, an excellent grinding medium for pigments. It is a solvent and fixative for such esters as occur in certain perfumes. It is practically non-volatile. It is an excellent solvent for pyroxylin of the degree of nitration corresponding to 12% of nitrogen.

We may use the compounds in a commercially pure state. Or, we may make compositions containing them. Thus we may make films containing pyroxylin with a certain proportion, say, a fourth by weight, of the high boiling solvent.

We claim:

1. An ethylene glycol derivative in which one of the hydroxyl groups of the glycol has been replaced by the radical of a phthalic acid, and the other hydroxyl group of the glycol has been replaced by the radical of another organic acid containing less than 6 carbon atoms to the molecule.

2. An ethylene glycol derivative in which one of the hydroxyl groups of the glycol has been replaced by the radical of ortho-phthalic acid, and the other hydroxyl group of the glycol has been replaced by the radical of another organic acid containing less than 6 carbon atoms to the molecule.

3. A beta-acetyl oxy-ethyl phthalate.

4. Beta-acetyl oxy-ethyl ortho-phthalate.

5. A composition of matter comprising the grouping of atoms represented by the formula

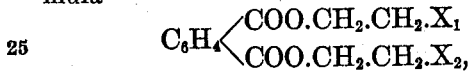

in which $X_1$ and $X_2$ represent each a group of atoms not containing nitrogen.

6. The process of preparing an acyl oxy-alkyl ester of a dibasic acid which comprises the step of heating the said ester at a temperature between 150° and 300° C., in a partial vacuum.

7. The process of preparing an acyl oxy-alkyl ester of a dibasic acid which comprises the step of heating the said ester at a temperature between 150° and 300° C., in a partial vacuum, in a stream of air.

8. The process of preparing beta-acetyl oxy-ethyl phthalate which comprises the step of heating the said phthalate at a temperature between 150° and 300° C., at less than 100 mm. pressure, in a stream of air.

In testimony that we claim the foregoing, we have hereunto set our hands this 26th day of April, 1927.

ROBERT H. VAN SCHAACK, Jr.
ROBERT CALVERT.